US008064164B2

(12) United States Patent
Yamashita et al.

(10) Patent No.: US 8,064,164 B2
(45) Date of Patent: Nov. 22, 2011

(54) PERPENDICULAR MAGNETIC RECORDING HEAD

(75) Inventors: Tomohiro Yamashita, Tokyo (JP); Hiroshi Kameda, Tokyo (JP); Katsuhiko Otomo, Tokyo (JP)

(73) Assignee: TDK Corporation, Tokyo (JP)

( * ) Notice: Subject to any disclaimer, the term of this patent is extended or adjusted under 35 U.S.C. 154(b) by 854 days.

(21) Appl. No.: 12/124,217

(22) Filed: May 21, 2008

(65) Prior Publication Data
US 2008/0297951 A1 Dec. 4, 2008

(30) Foreign Application Priority Data

Jun. 1, 2007 (JP) .................. P2007-146523

(51) Int. Cl.
*G11B 5/127* (2006.01)
(52) U.S. Cl. .................................... 360/125.3
(58) Field of Classification Search .......... 360/125.3, 360/125.03, 317, 125.09, 125.04, 123.1, 360/125.17, 125.12, 125.16, 125.06, 125.15, 360/122, 125.26, 125.19
See application file for complete search history.

(56) References Cited

U.S. PATENT DOCUMENTS

| 6,984,333 | B2 * | 1/2006 | Matono et al. ................ 216/22 |
| 7,522,376 | B2 * | 4/2009 | Matono et al. ............ 360/125.02 |
| 7,920,359 | B2 * | 4/2011 | Maruyama et al. ......... 360/125.3 |
| 2003/0174834 | A1 * | 9/2003 | Kida ...................... 379/428.01 |
| 2003/0189787 | A1 * | 10/2003 | Matono et al. ................ 360/126 |
| 2005/0264931 | A1 * | 12/2005 | McFadyen .................... 360/126 |
| 2006/0256481 | A1 * | 11/2006 | Kagami et al. ................ 360/317 |
| 2007/0274003 | A1 * | 11/2007 | Ota et al. ..................... 360/126 |
| 2008/0266721 | A1 * | 10/2008 | Kameda ...................... 360/314 |

FOREIGN PATENT DOCUMENTS

| JP | A-2004-039148 | 2/2004 |
| JP | A-2004-127407 | 4/2004 |
| JP | A-2004-326990 | 11/2004 |
| JP | A-2006-114160 | 4/2006 |
| JP | A-2006-209818 | 8/2006 |

* cited by examiner

*Primary Examiner* — Allen Cao
(74) *Attorney, Agent, or Firm* — Oliff & Berridge, PLC

(57) ABSTRACT

In a perpendicular magnetic recording head comprising a main magnetic pole layer and a return yoke layer which have respective front end faces exposed at a surface opposing a recording medium and are laminated with a nonmagnetic material layer interposed therebetween on the medium-opposing surface, an end magnetization control layer for generating an exchange-coupling field is provided on the upper or lower side of both end parts in a track width direction of the return yoke layer. The exchange-coupling field fixes magnetization in the end parts to the track width direction.

5 Claims, 5 Drawing Sheets

PERPENDICULAR MAGNETIC RECORDING HEAD

BACKGROUND OF THE INVENTION

1. Field of the Invention

The present invention relates to a perpendicular magnetic recording head which performs a recording action by applying a recording magnetic field perpendicularly to a recording medium.

2. Related Background Art

As is well-known, a perpendicular magnetic recording head includes a main magnetic pole layer and a return yoke layer which are laminated with a predetermined distance therebetween on a surface opposing a recording medium, a nonmagnetic insulating layer interposed between the main magnetic pole layer and return yoke layer, and a recording coil which is arranged within the nonmagnetic insulating layer and applies a recording magnetic field to the main magnetic pole layer and return yoke layer. The main magnetic pole layer and return yoke layer are magnetically coupled to each other on the deeper side in the height direction of the medium-opposing surface. When a recording magnetic field is induced between the main magnetic pole layer and return yoke layer upon energization of the recording coil, a leakage recording magnetic field occurs between the main magnetic pole layer and return yoke layer on the medium-opposing surface. This recording magnetic field perpendicularly enters a hard magnetic film of the recording medium from the front end face of the main magnetic pole layer opposing the recording medium and returns to the return yoke layer through a soft magnetic film of the recording medium. This subjects the recording medium to magnetic recording at a part opposing the front end face of the main magnetic pole layer. Typically, a nonmagnetic layer made of a nonmagnetic material such as $Al_2O_3$ or $SiO_2$, for example, is formed about the return yoke layer in order to secure a patterning precision in each of layers laminated on the upper side of the return yoke layer and is flattened such that the upper face of the nonmagnetic layer is flush with the upper face of the return yoke layer.

It has conventionally been common for such perpendicular magnetic recording heads to have a return yoke layer with a rectangular two-dimensional form. However, it has become clear that, when the return yoke layer has a rectangular two-dimensional form, external magnetic fields and recording magnetic fields returning from the recording medium are likely to concentrate on corners (right-angled parts) formed by the front end face exposed at the medium-opposing surface and both end faces in the track width direction, and that the concentration of magnetic fields turns the magnetization of the corner parts in the return yoke layer to a direction perpendicular to the medium-opposing surface, whereby leakage magnetic fluxes from the corner parts cause unintentional recording and erasing on the recording medium.

For preventing the return yoke layer from causing unintentional recording and erasing, it has been proposed, for example, to form both sides in the track direction of the return yoke layer with a tilted surface or curved surface gradually increasing the size in the track width direction of the return yoke layer in the height direction from the front end face exposed at the medium-opposing surface (e.g., Patent Document 1 (Japanese Patent Application Laid-Open No. 2004-039148), Patent Document 2 (Japanese Patent Application Laid-Open No. 2004-127407), and Patent Document 3 (Japanese Patent Application Laid-Open No. 2006-114160)). When the external magnetic fields and the recording magnetic fields returning from the recording medium are absorbed by a wide area of the tilted surface or curved surface, the concentration of magnetic fields is alleviated, whereby the unintentional recording and erasing by the return yoke layer can be suppressed. Patent Document 4 (Japanese Patent Application Laid-Open No. 2004-326990) and Patent document 5 (Japanese Patent Application Laid-Open No. 2006-209818) also disclose relative techniques. Specifically, they propose the magnetic recording head having auxiliary magnetic pole with multilayer structure which a magnetic layer and a nonmagnetic layer are successively laminated.

SUMMARY OF THE INVENTION

When the return yoke layer is formed with the tilted surface or curved surface, however, polishing for forming a surface opposing the recording medium, washing (ultrasonic washing) in a later step, and the like may cause peeling and chipping in the flattened nonmagnetic layer filling the gap between the medium-opposing surface and the tilted surface or curved surface. As the angle of the tilted surface or curved surface provided with the return yoke layer (the angle formed between the medium-opposing surface and the tilted surface or curved surface) is smaller, the peeling and chipping of the flattened nonmagnetic layer becomes greater, though the resistance to external magnetic fields improves.

In view of the problem mentioned above, it is an object of the present invention to provide a perpendicular magnetic recording head which is excellent in the resistance to external magnetic fields and can prevent unintentional recording and erasing on the recording medium.

The present invention is achieved by focusing attention on the facts that securing the magnetization direction of both end parts in the track width direction of the return yoke layer to the track width direction can reduce leakage magnetic fluxes directed from the end parts to the recording medium, thereby preventing unintentional recording and erasing onto the recording medium, and that using an exchange-coupling field of an antiferromagnetic layer is the most suitable for controlling the magnetization direction.

Namely, the present invention is a perpendicular magnetic recording head comprising a main magnetic pole layer and a return yoke layer which have respective front end faces exposed at a surface opposing a recording medium and are laminated with a nonmagnetic material layer interposed therebetween on the medium-opposing surface; wherein an end magnetization control layer for generating an exchange-coupling field is provided on the upper or lower side of both end parts in a track width direction of the return yoke layer, while the exchange-coupling field fixes magnetization in the end parts to the track width direction.

It will be sufficient if the end magnetization control layer is formed at least on the front end face side that is susceptible to external magnetic fields. Preferably, the end magnetization control layer is formed in a part of the return yoke layer from the front end face thereof to the deeper side in the height direction.

The end magnetization control layer may be constituted by an antiferromagnetic film which is in direct contact with the end parts in the track width direction of the return yoke layer and generates the exchange-coupling field. The end magnetization control layer may also be constituted by an antiferromagnetic film for generating the exchange-coupling field and a ferromagnetic alloy film, interposed between the antiferromagnetic film and the return yoke layer, for enhancing the exchange-coupling field. More specifically, for example, IrMn or PtMn may be used for the antiferromagnetic film, while CoFe-based alloys may be used for the ferromagnetic alloy film.

Preferably, the return yoke layer has a tilted surface or curved surface gradually widening a size in the track width direction of the return yoke layer in a height direction from the front end face at both end parts in the track width direction. When the tilted surface or curved surface is provided, the external magnetic fields and the recording magnetic fields returning from the recording medium can be absorbed by a wide area, whereby the concentration of magnetic fields can be alleviated. Using it together with a pair of end magnetization control layers further improves the resistance to external magnetic fields.

Since the exchange-coupling field generated between the end magnetization control layer and both end parts in the track width direction of the return yoke layer secures the magnetization direction of the end parts to the track width direction, the present invention can yield a perpendicular magnetic recording head which is excellent in the resistance to external magnetic fields and can prevent unintentional recording and erasing on the recording medium.

DESCRIPTION OF THE PREFERRED EMBODIMENTS

In the following, the present invention will be explained with reference to the drawings. In each drawing, X, Y, and Z directions are defined by the track width direction, the height direction, and the laminating direction of layers constituting a thin-film magnetic head or the moving direction of a recording medium, respectively.

Figure 1:
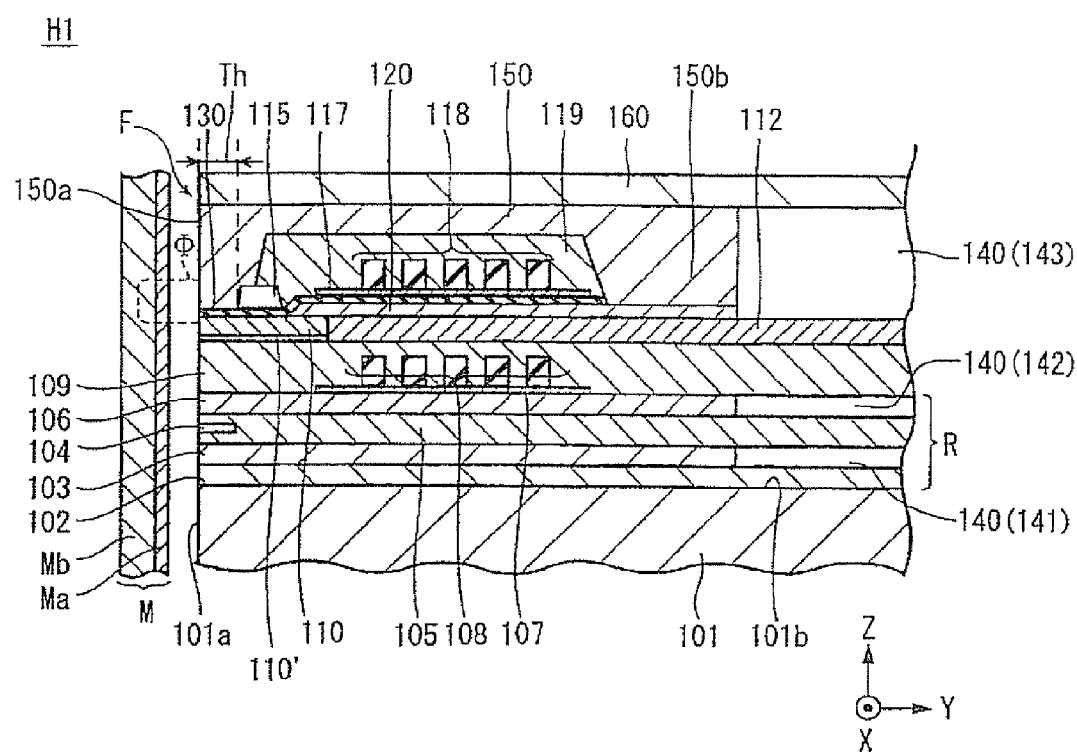
FIG. 1 is a sectional view showing the overall structure of the perpendicular magnetic recording head in accordance with the first embodiment.
Figure 2:
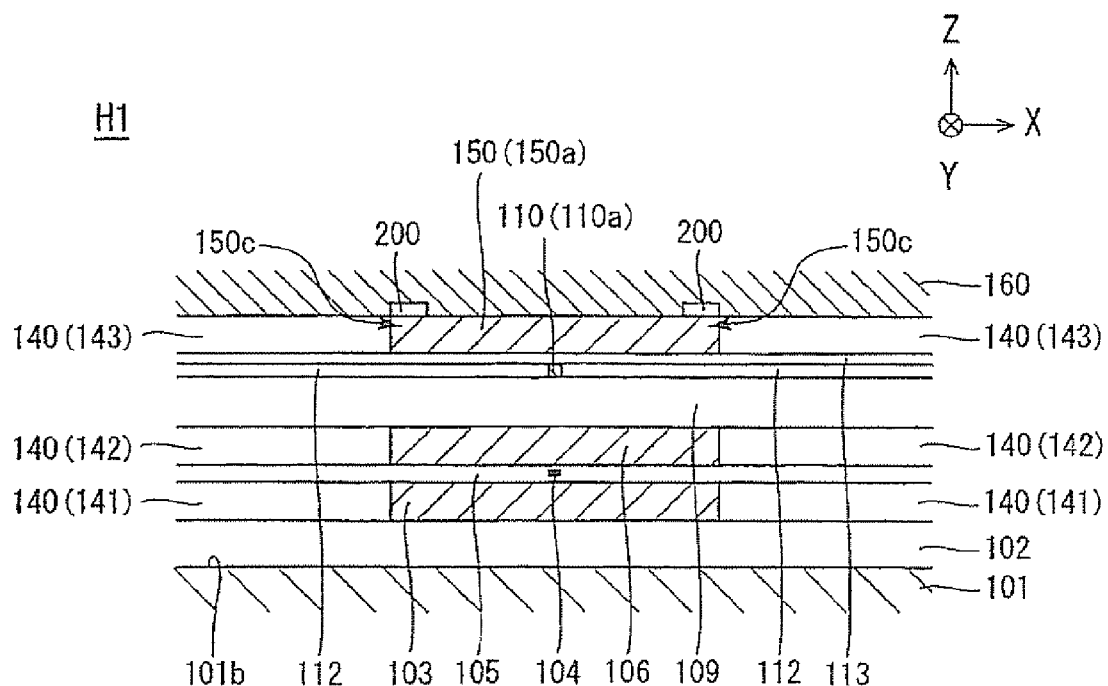
FIG. 2 is a sectional view showing the multilayer structure of the perpendicular magnetic recording head as seen from the medium-opposing surface side.
Figure 3:
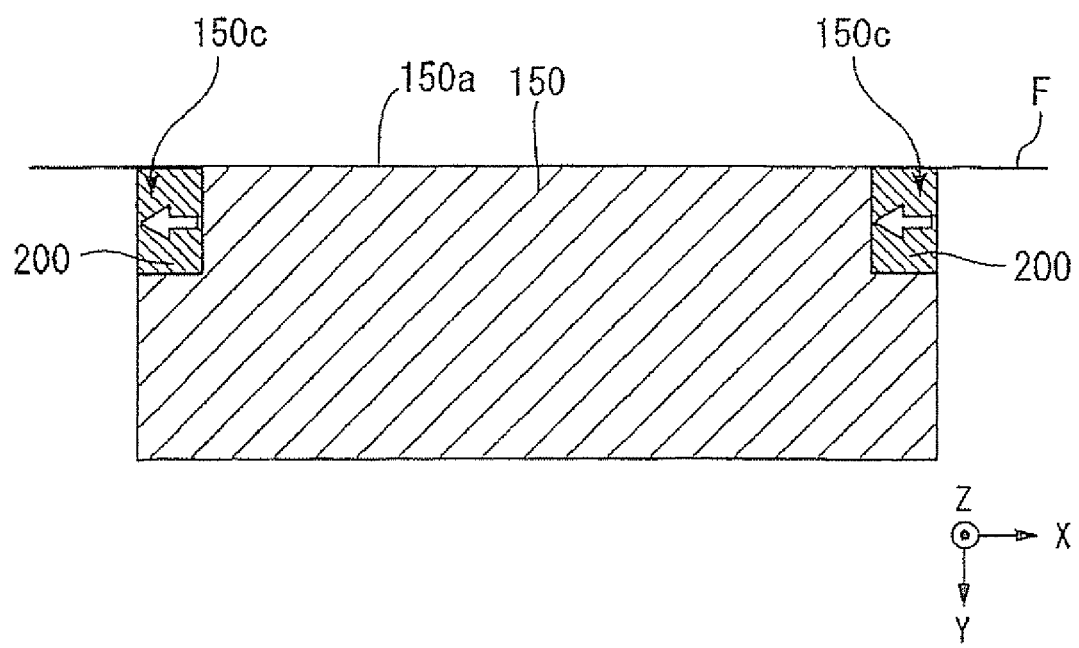
FIG. 3 is a plan view showing the perpendicular magnetic recording head as seen from the upper side.

FIG. 1 is a sectional view showing the multilayer structure of the perpendicular magnetic recording head H1 in accordance with a first embodiment of the present invention. FIG. 2 is a sectional view showing the perpendicular magnetic recording head H1 as seen from its medium-opposing surface. FIG. 3 is a plan view showing the perpendicular magnetic recording head H1 as seen from the upper side.

The perpendicular magnetic recording head H1 provides a recording medium M with a recording magnetic flux $\Phi$ perpendicular thereto, thereby perpendicularly magnetizing a hard magnetic film Ma of the recording medium M. The recording medium M has the hard magnetic film Ma with a higher remanent magnetization on the medium surface side and a soft magnetic film Mb with a higher magnetic permeability on the inner side of the hard magnetic film Ma. The recording medium M is shaped like a disk, for example, and rotated about the center of the disk as a rotary axis. A slider 101 is formed by a nonmagnetic material such as $Al_2O_3 \cdot TiC$. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reproducing part R is formed on the nonmagnetic insulating layer 102. The reproducing part R has a lower shield layer 103, an upper shield layer 106, an inorganic insulating layer (gap insulating layer) 105 filling the gap between the lower and upper shield layers 103, 106, and a reproducing device 104 positioned within the inorganic insulating layer 105. The reproducing device 104 is a magnetoresistive device such as AMR, GMR, or TMR. Nonmagnetic layers 140 (first and second nonmagnetic layers 141, 142) made of a nonmagnetic material such as $Al_2O_3$, $SiO_2$, Ta, or DLC are formed about the lower and upper shield layers 103, 106, respectively, such that the upper face of the lower shield layer 103 and the upper face of the first nonmagnetic layer 141 are flush with each other and that the upper face of the upper shield layer 106 and the upper face of the first nonmagnetic layer 142 are flush with each other.

By way of a coil insulating foundation layer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. A plating foundation layer 110' is formed on the flat surface, while a main magnetic pole layer 110 made of a ferromagnetic material having a high saturated magnetic flux density such as Ni—Fe, Co—Fe, or Ni—Fe—Co is formed on the plating foundation layer 110'. The main magnetic pole layer 110 has a front end face 110a exposed at the medium-opposing surface F. The size of the front end face 110a in the depicted X direction is defined by a writing track width. The main magnetic pole layer 110 in this embodiment is not formed totally on the coil insulating layer 109 but locally on only the medium-opposing surface F side, and is magnetically coupled to an auxiliary yoke layer 120 on the deeper side in the height direction. The auxiliary yoke layer 120 is made of a magnetic material having a saturated magnetic flux density lower than that of the main magnetic pole layer 110, and transmits magnetic fluxes of recording magnetic fields induced by the recording coil (first and second coil layers 108, 118) to the main magnetic pole layer 110. A nonmagnetic material layer 112 is formed about the main magnetic pole layer 110 and made flat such that the upper face of the main magnetic pole layer 110 and the upper face of the nonmagnetic material layer 112 are flush with each other.

A magnetic gap layer 130 made of an inorganic nonmagnetic insulating material such as $Al_2O_3$ or $SiO_2$, for example, is formed on the main magnetic pole layer 110 and auxiliary yoke layer 120 by a thickness corresponding to a predetermined gap distance. The thickness of the magnetic gap layer 130 is about 50 nm at present. On the magnetic gap layer 130, a height determining layer 115 is formed at a position retracted from the medium-opposing surface F by a predetermined throat height Th to the deeper side in the height direction, while the second coil layer 118 is formed on the deeper side of the height determining layer 115 in the height direction by way of a coil insulating foundation layer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nonmagnetic metal materials are laminated. The first and second coil layers 108, 118 are electrically connected to each other at their end parts in the track width direction (depicted X direction) so as form a solenoid. The form of coil layers is not limited to the solenoid in particular, though. A coil insulating layer 119 is formed about the second coil layer 118.

A return yoke layer 150 made of a ferromagnetic material having a high saturated magnetic flux density such as Ni—Fe, Co—Fe, or Ni—Fe—Co is formed such as to extend over the coil insulating layer 119, height determining layer 115, and magnetic gap layer 130. As shown in FIG. 3, the return yoke layer 150 has a rectangular two-dimensional form, opposes the main magnetic pole layer 110 with a predetermined gap (gap distance) therebetween at the front end face 150a exposed at the medium-opposing surface F, and is connected to the main magnetic pole layer 110 at a junction 150b positioned on the deeper side in the height direction of the front end face 150a. The throat height Th is defined by the height determining layer 115 as mentioned above. A nonmagnetic layer 140 (third nonmagnetic layer 143) made of a nonmagnetic material such as $Al_2O_3$, $SiO_2$, Ta, or DLC, for example, is formed about the return yoke layer 150 and made flat such that the upper face of the return yoke layer 150 and the upper face of the third nonmagnetic layer 143 are flush with each other. The return yoke layer 150 and third nonmagnetic layer 143 are covered with a protecting layer 160 made of an inorganic nonmagnetic insulating material.

At both end parts 150c in the track width direction of the return yoke layer 150, the perpendicular magnetic recording head H1 having the foregoing structure is provided with a pair of end magnetization control layers 200 which secure the magnetization direction in the end parts 150c to the track width direction by an exchange-coupling field occurring between the return yoke layer 150 and the end magnetization control layers 200. Here, the end parts 150c in the track width direction of the return yoke layer 150 are respective areas extending from both ends in the track width direction of the return yoke layer 150 toward the center part thereof, each occupying about 10% of the total length in the track width direction of the return yoke layer 150. The magnetization directions at both end parts in the track width direction of the return yoke layer 150 are indicated by whitened arrows in FIGS. 3 and 4.

Figure 4:
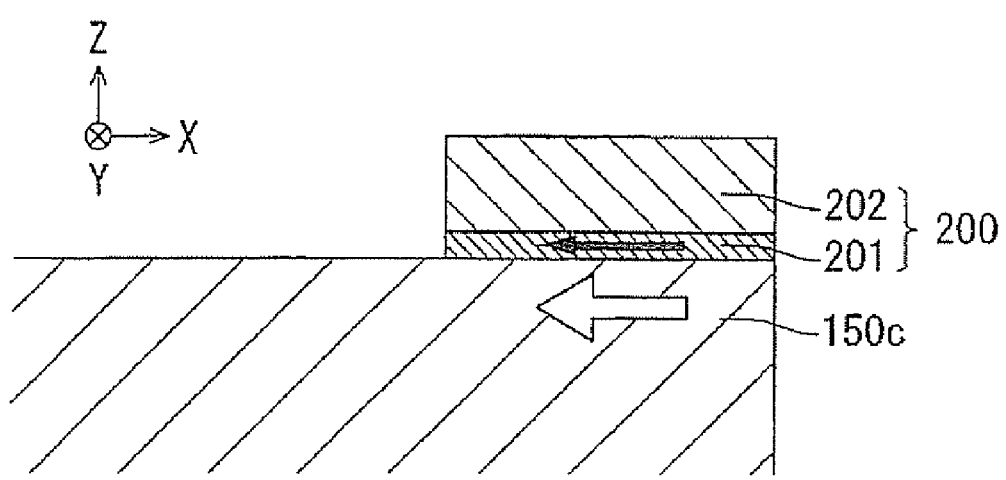
FIG. 4 is an enlarged sectional view for explaining the magnetization direction at both end parts in the track width direction of the return yoke layer in the perpendicular magnetic recording head.

FIG. 4 is an enlarged sectional view showing the end magnetization control layer 200 under magnification. The end magnetization control layers 200 have a two-layer structure in which a ferromagnetic alloy film 201 and an antiferromagnetic film 202 are successively laminated on each of the end parts in the track width direction of the return yoke layer 150.

When heat-treated, the antiferromagnetic film 202 generates a large exchange-coupling field between it and its corresponding end parts in the track width direction of the return yoke layer 150, while this exchange-coupling field provides the end parts in the track width direction of the return yoke layer 150 with magnetic anisotropy parallel to the track width direction. Namely, the antiferromagnetic films 202 fix the magnetization at both end parts in the track width direction of the return yoke layer 150 to the track width direction. Each of the antiferromagnetic films 202 is an alloy film made of an antiferromagnetic material containing an element Z (where Z is at least one element of Pt, Pd, Ir, Rh, Ru, and Os) and Mn or an antiferromagnetic material containing the element Z, an element Z' (where Z' is at least one element of Ne, Ar, Kr, Xe, Be, B, C, N, Mg, Al, Si, P, Ti, V, Cr, Fe Co, Ni, Cu, Zn, Ga, Ge, Zr, Nb, Mo, Ag, Cd, Sn, Hf, Ta, W, Re, Au, Pb, and rare-earth elements), and Mn, and is formed by a thickness of about 5 to 20 nm. Such an antiferromagnetic material is excellent in corrosion resistance, has a high blocking temperature, and can generate a large exchange-coupling field between it and the return yoke layer 150 made of a ferromagnetic material such as Ni—Fe, Co—Fe, or Ni—Fe—Co. A specific magnitude of the exchange-coupling field is 23.9 to 119.4 kA/m (300 to 1500 Oe).

The ferromagnetic alloy film 201 is a magnetic layer, interposed between the antiferromagnetic film 202 and return yoke layer 150 by a thickness of 5 nm or less, for enhancing the exchange-coupling field occurring between the antiferromagnetic film 202 and return yoke layer 150. The ferromagnetic alloy film 201 is a CoFe-based alloy film containing CoFe and has been known to generate a large exchange-coupling field at an Fe content of 20 to 40 at %. For example, it generates an exchange-coupling field of 79.6 kA/m (1000 Oe) or greater in combination with an antiferromagnetic film made of an IrMn alloy.

The end magnetization control layers 200 are formed partly in the height direction from the front end face 150a to the deeper side in the height direction. Namely, they are positioned on respective corners (right-angled parts) formed by the front end face 150a of the return yoke layer 150 exposed at the medium-opposing surface F and both end faces in the track width direction. In the return yoke layer 150 having a rectangular two-dimensional form, the perpendicular recording magnetic field Φ returning to the return yoke layer 150 through the recording medium M and external magnetic fields are likely to concentrate on the corners (right-angled parts). It will be sufficient if the end magnetization control layers 200 are formed in areas susceptible to the external magnetic fields, i.e., on the front end face 150a (the side exposed to the medium-opposing surface F). However, they may be formed throughout the length in the height direction of the return yoke layer 150.

As in the foregoing, the exchange-coupling field generated between the return yoke layer 150 and the pair of end magnetization control layers 200 fixes the magnetization at the end parts 150c in the track width direction of the return yoke layer 150 to the track width direction in this embodiment, so that the magnetization can be prevented from fluctuating at the end parts 150c even when the perpendicular recording magnetic field Φ returning to the return yoke layer 150 through the recording medium M and external magnetic fields concentrate on the end parts 150c, whereby the resistance to external magnetic fields improves. This can reduce leakage magnetic fields directed from the end parts 150c in the track width direction of the return yoke layer 150 to the recording medium M, thereby preventing the end parts 150c from causing problems such as unintentional recording and erasing on the recording medium. The end parts 150c in the track width direction of the return yoke layer 150 may be made locally thicker so as to keep their magnetization from being affected by external magnetic fields. However, simply thickening the end parts 150c cannot suppress fluctuations in the magnetization of the end parts 150c when the external magnetic field intensity becomes strong.

In the return yoke layer 150, the magnetization direction is controlled by the pair of end magnetization control layers 200 only in the end parts 150c in the track width direction, whereby the recording performance is not adversely affected in the first embodiment. Further, an excellent resistance to external magnetic fields can be obtained even with the return yoke layer 150 having a rectangular two-dimensional form, whereby the nonmagnetic layer 143 burying the surroundings of the return yoke layer 150 can be prevented from peeling and failing.

Figure 5:
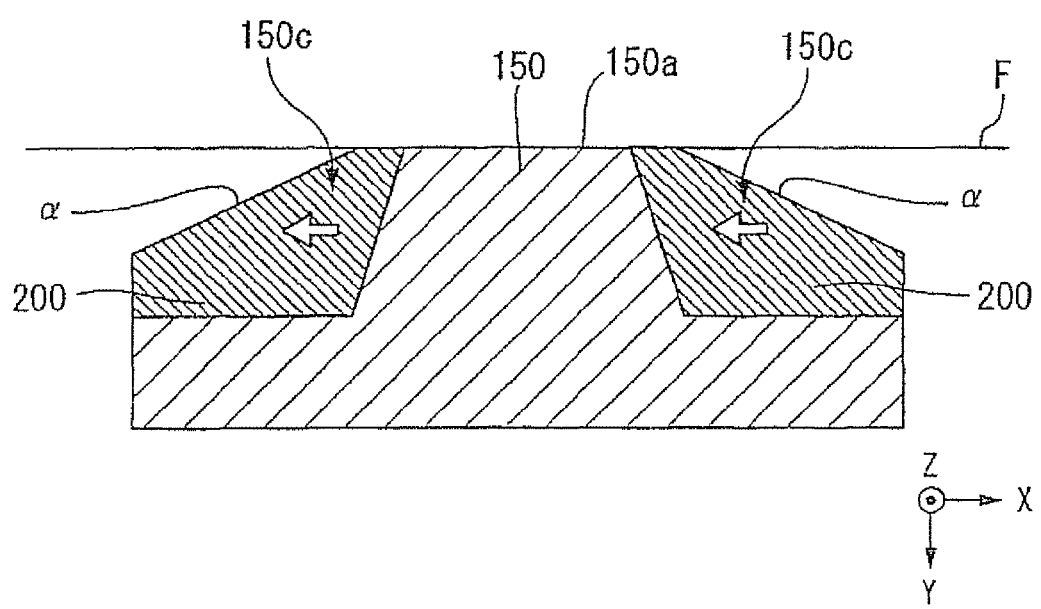
FIG. 5 is a plan view showing the perpendicular magnetic recording head in accordance with the second embodiment as seen from the upper side.

FIG. 5 shows the perpendicular magnetic recording head H2 in accordance with a second embodiment of the present invention. The second embodiment is an embodiment in which each of both sides in the track width direction of the return yoke layer 150 is formed with a tilted surface α gradually increasing the size in the track width direction of the return yoke layer 150 from the front end face 150*a* exposed at the medium-opposing surface F to the deeper side in the height direction. Since each of the corners formed between the front end face 150*a* and the tilted surface α (the angle θ between the front end face 150*a* and the tilted surface α) is obtuse, the perpendicular recording magnetic field Φ returning to the return yoke layer 150 through the recording medium M and external magnetic fields do not solely concentrate on the corners, but diffuse over a wide area of the front end face 150*a* and tilted surface α and are absorbed thereby. When the concentration of magnetic fields is alleviated as such, the resistance to external magnetic fields improves more than in the first embodiment in which the corners of the return yoke layer 150 have right angles. Since a pair of end magnetization control layers 200 are provided, the resistance to external magnetic fields can fully be secured even when the angle of the tilted surface α is not made smaller, whereby the nonmagnetic layer 143 burying the surroundings of the return yoke layer 150 can be prevented from peeling and failing. Each side in the track width direction of the return yoke layer 150 may be formed with a curved surface instead of the tilted surface α.

Though only both end parts 150*c* in the track width direction of the return yoke layer 150 are provided with a pair of end magnetization control layers 200 in the foregoing embodiments, both end parts in the track width direction of magnetic layers exposed at the medium-opposing surface F other than the return yoke layer 150 may be provided with a pair of end magnetization control layers for fixing the magnetization of the end parts to the track width direction. For example, the lower shield layer 103 and upper shield layer 106 are exposed at the medium-opposing surface F, and may cause a fear of magnetic fields concentrating on corners (right-angled parts) made of a magnetic material in the vicinity of the medium-opposing surface F if any. Therefore, it will be desirable if magnetization directions at both end parts in the track width direction of the lower and upper shield layers 103, 106 are secured to the track width direction by using a pair of end magnetization control layers, so as to prevent the magnetization from fluctuating at the corners of the lower and upper shield layers 103, 106. This farther improves the resistance to external magnetic fields. The return yoke layer also encompasses a floating shield mode having no magnetic connection to the main magnetic pole layer.

What is claimed is:

1. A perpendicular magnetic recording head comprising a main magnetic pole layer and a return yoke layer, the main magnetic pole layer and return yoke layer having respective front end faces exposed at a surface opposing a recording medium and being laminated with a nonmagnetic material layer interposed therebetween on the medium-opposing surface;

wherein an end magnetization control layer for generating an exchange-coupling field is provided on the upper or lower side of both end parts in a track width direction of the return yoke layer, the exchange-coupling field fixing magnetization in the end parts of the return yoke layer in the track width direction.

2. A perpendicular magnetic recording head according to claim 1, wherein the end magnetization control layer is formed in a part of the return yoke layer from the front end face thereof to the deeper side in a height direction thereof.

3. A perpendicular magnetic recording head according to claim 1, wherein the end magnetization control layer is an antiferromagnetic film in direct contact with the end parts in the track width direction of the return yoke layer, the antiferromagnetic film generating the exchange-coupling field.

4. A perpendicular magnetic recording head according to claim 1, wherein the end magnetization control layer is formed by an antiferromagnetic film for generating the exchange-coupling field and a ferromagnetic alloy film, interposed between the antiferromagnetic film and the return yoke layer, for enhancing the exchange-coupling field.

5. A perpendicular magnetic recording head according to claim 1, wherein the return yoke layer has a tilted surface or curved surface gradually widening a size in the track width direction of the return yoke layer in a height direction from the front end face at both end parts in the track width direction.

* * * * *